United States Patent
Tobari et al.

(10) Patent No.: US 7,521,887 B2
(45) Date of Patent: Apr. 21, 2009

(54) VECTOR CONTROLLER FOR A PERMANENT MAGNET SYNCHRONOUS MOTOR, INVERTER MODULE, AND PERMANENT MAGNET SYNCHRONOUS MOTOR CONSTANT DISPLAY SYSTEM

(75) Inventors: Kazuaki Tobari, Hitachiota (JP); Tsunehiro Endo, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 11/606,976

(22) Filed: Dec. 1, 2006

(65) Prior Publication Data

US 2007/0126391 A1 Jun. 7, 2007

(30) Foreign Application Priority Data

Dec. 2, 2005 (JP) ............................. 2005-348614

(51) Int. Cl.
H02P 6/00 (2006.01)
(52) U.S. Cl. .................. 318/717; 318/700; 318/400.01; 318/807; 318/809; 318/801; 318/453; 318/471
(58) Field of Classification Search ................ 318/700, 318/400.01, 801, 807, 809, 717, 453, 471
See application file for complete search history.

(56) References Cited

U.S. PATENT DOCUMENTS

| 7,071,641 | B2* | 7/2006 | Arai et al. ............... 318/400.02 |
| 7,102,305 | B2* | 9/2006 | Suzuki ................... 318/400.02 |
| 2002/0149342 | A1* | 10/2002 | Nakata et al. ............... 318/801 |

FOREIGN PATENT DOCUMENTS

JP 2001-145399 5/2001

* cited by examiner

Primary Examiner—Rita Leykin
(74) Attorney, Agent, or Firm—Antonelli, Terry, Stout & Kraus, LLP.

(57) ABSTRACT

A vector controller for a permanent magnet synchronous motor uses current command values and detected currents of the d-axis and q-axis, a calculated frequency, and motor constant settings to control the output voltage of a power converter; the motor constants are identified by use of active or reactive power obtained from the output voltage and detected current of the power converter, the calculated frequency, and the detected current immediately before or during an actual operation.

13 Claims, 10 Drawing Sheets

CALCULATION FOR IDENTIFYING THE RESISTANCE R

CALCULATION FOR IDENTIFYING
THE q-AXIS INDUCTANCE Lq

CALCULATION FOR IDENTIFYING THE INDUCED VOLTAGE COEFFICIENT Ke

CALCULATION FOR IDENTIFYING THE d-AXIS INDUCTANCE Ld

VECTOR CONTROLLER FOR A PERMANENT MAGNET SYNCHRONOUS MOTOR, INVERTER MODULE, AND PERMANENT MAGNET SYNCHRONOUS MOTOR CONSTANT DISPLAY SYSTEM

CLAIM OF PRIORITY

The present application claims priority from Japanese application serial no. 2005-348614, filed on Dec. 2, 2005, the content of which is hereby incorporated by reference into this application.

BACKGROUND OF THE INVENTION

1. Field of the Invention

The present invention relates to a vector control system for a permanent magnet synchronous motor.

2. Description of the Prior Art

In a motor constant identification technology, as described in Japanese Patent Laid-open No. 2001-145399, which is used in a vector control system applied to a permanent magnet synchronous motor, the values of d-axis and q-axis voltages detected by a voltage detector attached to a power converter are used in calculation for identifying motor constants in three processes described below.

(1) An induced voltage coefficient of the motor is identified from a difference in the q-axis (torque) component in vector control between a voltage command value and a detected voltage.

(2) A motor resistance is identified from a difference in the d-axis (magnetic flux) component between a voltage command value and a detected voltage.

(3) If the resistance identified in (2) above exceeds a limit value, a switchover is made to an operation in which a q-axis inductance is identified from the voltage difference in the d-axis component.

SUMMARY OF THE INVENTION

In the technology described in the Japanese Patent Laid-open No. 2001-145399, a voltage detector specific to the power converter is required, and a reduction in motor constant identification precision due to a voltage offset and other factors may reduce control characteristics.

An object of the present invention is to provide a vector controller for a permanent magnet synchronous motor that achieves highly precise, highly responsive torque control without using a detector.

According to the present invention, the active power or reactive power of a permanent magnet synchronous motor, a frequency command value, and a current are used as described below. In a low-speed area:

(1) segments are provided, in which d-axis current is controlled with at least two levels, zero and positive (or negative); the d-axis current and a difference in the active power between the two segments, that is, the zero segment and the positive or negative segment, are used to identify the motor resistance.

In middle- and high-speed areas:

(2) the d-axis current is controlled to zero; a calculated frequency, the q-axis current, and a difference in the reactive power in the segment in which the d-axis current is zero are used to identify the q-axis inductance of the motor;

(3) segments are provided, in which the d-axis current is controlled with at least two levels, positive and negative; a calculated frequency, the d-axis current, and a difference in the reactive power in the two segments, that is, the positive and negative segments, are used to identify the induced voltage coefficient of the motor;

(4) segments are provided, in which the d-axis current is controlled with at least three levels, positive, negative, and zero; a calculated frequency, the d-axis current, and a total of the reactive powers in the three segments are used to identify the d-axis inductance of the motor; and (5) the motor constants identified as described above are used to automatically modify control constants used for voltage command value calculation or modify a control gain used for calculation of a current control output value, based on which an intermediate current command value or a voltage command value is created.

The present invention can provide a vector controller for a permanent magnet synchronous motor that achieves highly precise, highly responsive torque control.

DESCRIPTION OF THE PREFERRED EMBODIMENTS

The present invention relates to a vector control system for a permanent magnet synchronous motor and, more particularly, to a technology that achieves highly precise, highly responsive torque control by identifying motor constants and automatically modifying motor constants stored in a control system, immediately before or during an actual operation.

Embodiments of the present invention will be described below in detail with reference to the drawings.

First Embodiment

Figure 1:
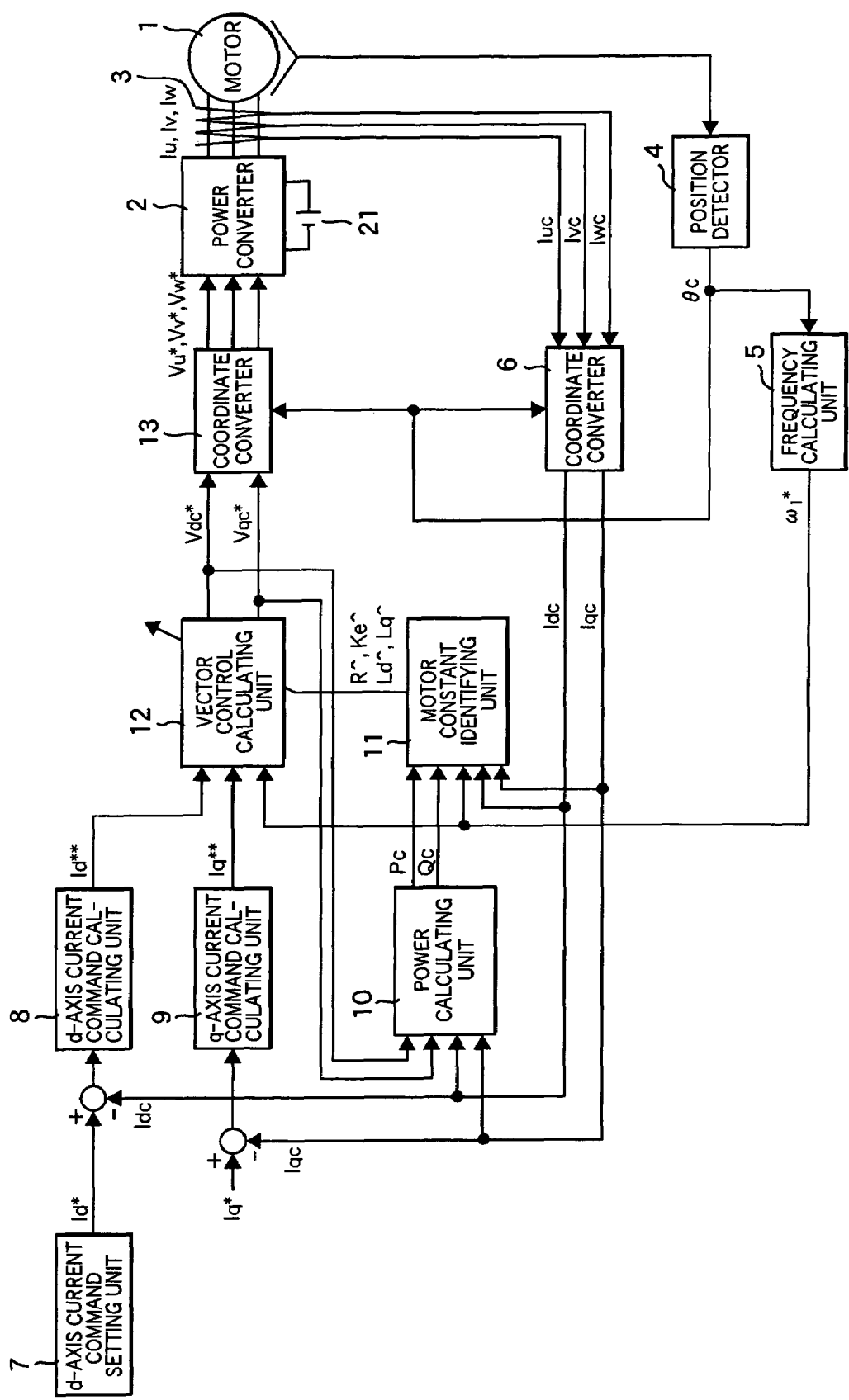
FIG. 1 shows the structure of a vector controller for a permanent magnet motor that implements a first embodiment of the present invention.

FIG. 1 shows an exemplary structure of a vector controller of a permanent magnet synchronous motor that embodies the present invention. The vector controller comprises a permanent magnet synchronous motor 1; a power converter 2 that outputs voltages in proportion to voltage command values Vu*, Vv*, and Vw* for three-phase AC currents; a DC power supply 21; a current detector 3 that detects three-phase AC currents Iu, Iv, and Iw; a position detector 4 that detects the position θ of the motor; a frequency calculating unit 5 that outputs a frequency $\omega_1^*$ calculated from a detected position θc; a coordinate converter 6 that outputs currents Idc and Iqc respectively detected on the d-axis and q-axis according to the detected three-phase AC currents Iuc, Ivc, and Iwc and the detected position θc; a d-axis current command setting unit 7 that sets a first d-axis current command value Id*; a d-axis current command calculating unit 8 that outputs a second d-axis current command value Id**, which is an intermediate value, according to a difference between the first d-axis current command value Id* and the detected d-axis current Idc; a q-axis current command calculating unit 9 that outputs a second q-axis current command value Iq**, which is an intermediate value, according to a difference between a first q-axis current command value Iq* given from a high-end unit and the detected q-axis current Iqc; a power calculating unit 10 that calculates the reactive power and active power of the permanent magnet synchronous motor 1 from the voltage command values Vdc* and Vqc* and the detected currents Idc and Iqc and outputs calculated active power Pc and calculated reactive power Qc; a motor constant identifying unit 11 that uses the reactive power Pc, active power Qc, and detected currents Idc and Iqc to perform calculation for obtaining an identified resistance R^, identified d-axis and q-axis inductances Ld^ and Lq^, and identified induced voltage coefficient Ke^, which are all used by the permanent magnet synchronous motor 1; a vector control calculating unit 12 that uses the second intermediate d-axis and q-axis current command values Id and Iq, the calculated frequency $\omega_1^*$, and motor constant settings (R*, Ld*, Lq*, and Ke*) or values (R^, Ld^, Lq^, and Ke^) output by the motor constant identifying unit 11 to output the voltage command values Vdc* and Vqc*; and a coordinate converter 13 that outputs the voltage command values Vu*, Vv*, and Vw* for three-phase AC currents according to the voltage command values Vdc* and Vqc* and the detected position θc.

First, a basic method of controlling voltages and phases, which is used by the vector controller for a permanent magnet synchronous motor, will be described.

In the basic operation in voltage control, the d-axis and q-axis current command calculating units 8 and 9 respectively use the first current command values Id* and Iq* given from the high-end unit as well as the detected currents Idc and Iqc to calculate the second intermediate current command values Id and Iq that are used for vector control calculation.

The vector control calculating unit 12 uses the second current command values Id and Iq, the frequency command value $\omega_1^*$, and the motor constant settings to calculate the voltage command values Vd and Vq shown in equation (1) so as to control the voltage command values Vu*, Vv*, and Vw*.

[Equation 1]

$$\begin{bmatrix} Vdc^* \\ Vqc^* \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} \quad (1)$$

Where, R is a resistance, Ld is a d-axis inductance, Lq is a q-axis inductance, Ke is an inducted voltage coefficient, and * is a setting.

In the basic operation in phase control, the position detector 4 obtains the detected position θc of the permanent magnet synchronous motor 1. The frequency calculating unit 5 calculates the frequency command value $\omega_1^*$, shown in equation (2), from the detected position θc.

[Equation 2]

$$\omega_1^* = \frac{d}{dt}\Delta\theta \quad (2)$$

The reference phase used by the coordinate converters 6 and 13 is set to the detected position θc so as to control the phase of the permanent magnet synchronous motor 1.

This completes the description of the basic operation in voltage control and phase control performed by the vector controller for a permanent magnet synchronous motor.

Next, control characteristics when the motor constant identifying unit 11, by which the present invention is characterized, is not provided (the motor constant settings are R*, Ld*, Lq*, and Ke*) will be described.

Figure 2:
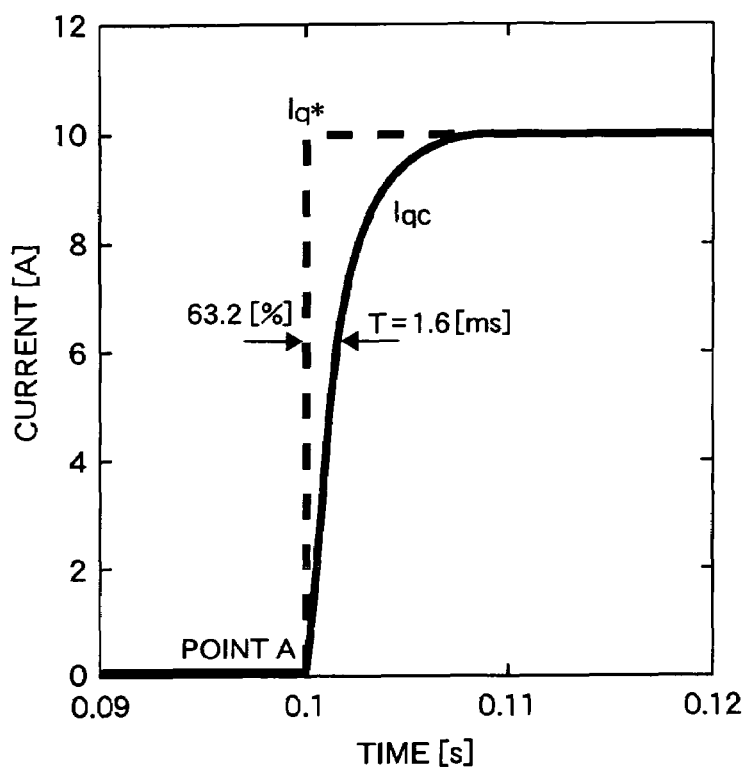
FIG. 2 shows a current control characteristic when the inductance of the motor matches an inductance setting used in vector calculation (Ld*=Ld, Lq*=Lq).
Figure 3:
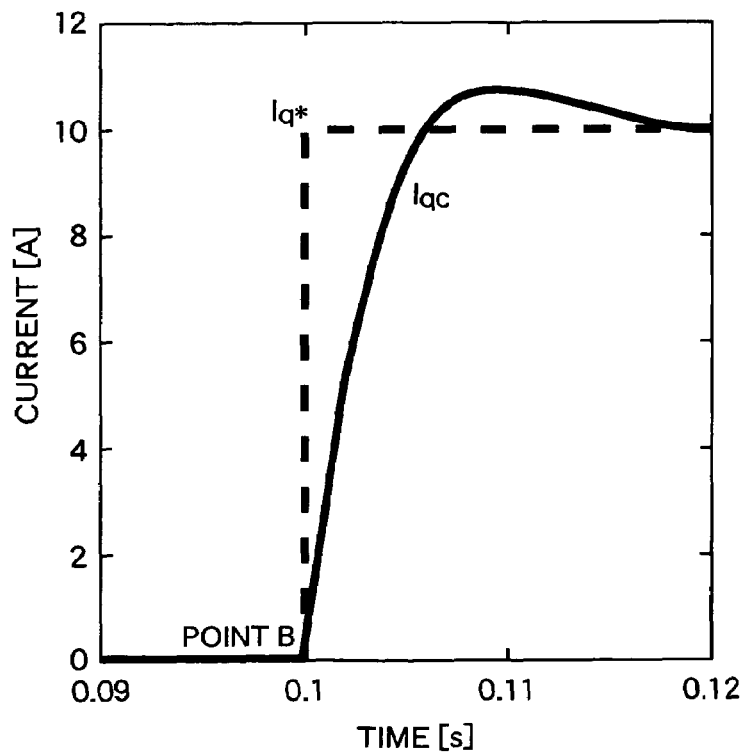
FIG. 3 shows a current control characteristic when the inductance of the motor does not match an inductance setting used in vector calculation (Ld*=0.5×Ld, Lq*=0.5×Lq).

FIGS. 2 and 3 show current step response characteristics of the vector controller shown in FIG. 1 when there is motor constant setting error.

FIG. 2 shows a current control characteristics when the d-axis and q-axis inductances Ld and Lq of the permanent magnet synchronous motor 1 respectively match the settings Ld* and Lq* that are given in the vector control calculating unit 12 (Ld*=Ld, Lq*=Lq).

Suppose that the motor is running at a fixed speed, if the q-axis current command value Iq* is step-changed at point A (0.1 second) as indicated by the dashed lines. The graph indicates that the detected q-axis current Iqc follows immediately with a response time of 1.6 ms without an overshoot.

FIG. 3 shows a current control characteristics when the inductances Ld and Lq of the motor do not match the settings Ld* and Lq* (Ld*=0.5×Ld, Lq*=0.5×Lq). In this case, the detected q-axis current Iqc follows slowly the command value Iq* and there is an overshoot.

That is, if there is motor setting error, the characteristic in following the current command value is impaired, finally leading to a slow torque response and reduced torque precision.

The motor constant identifying principles in which the active power and reactive power of the permanent magnet synchronous motor 1 are used will be described below.

The voltages Vd and Vq applied to the permanent magnet synchronous motor 1 on the d-axis and q-axis, respectively, are represented by using the motor currents Id and Iq and motor constants, as follows.

[Equation 3]

$$\begin{bmatrix} Vd \\ Vq \end{bmatrix} = \begin{bmatrix} R & -\omega_1 \cdot Lq \\ \omega_1 \cdot Ld & R \end{bmatrix} \cdot \begin{bmatrix} Id \\ Iq \end{bmatrix} + \begin{bmatrix} 0 \\ \omega_1 \cdot Ke \end{bmatrix} \quad (3)$$

First, the principle of identifying the resistance R will be described, focusing on the active power P.

The active power P of the permanent magnet synchronous motor 1 can be indicated by equation (4).

[Equation 4]

$$P = Vd \cdot Id + Vq \cdot Iq \quad (4)$$

Equations (3) and (4) yield equation (5).

[Equation 5]

$$P = (R \cdot Id - \omega_1 \cdot Lq \cdot Iq) \cdot Id + (R \cdot Iq + \omega_1 \cdot Ld \cdot Id + \omega_1 \cdot Ke) \cdot Iq \quad (5)$$
$$= R \cdot (Id^2 + Iq^2) + \omega_1 \cdot Iq \cdot (Ke + (Ld - Lq) \cdot Id)$$

When the active power calculated by the controller is Pc, it is represented as follows.

[Equation 6]

$$Pc = Vdc^* \cdot Idc + Vqc^* \cdot Iqc \quad (6)$$

Assuming that the motor axis is aligned with the control axis (the active power P matches the calculated active power Pc), when, in equation (5), the motor currents Id and Iq are replaced with the detected motor currents Idc and Iqc and the motor frequency $\omega_1$ is replaced with the calculated motor frequency $\omega_1^*$, equation (7) holds.

[Equation 7]

$$Pc = R \cdot (Idc^2 + Iqc^2) + \omega_1^* \cdot Iqc \cdot (Ke + (Ld - Lq) \cdot Idc) \quad (7)$$

If the calculated motor frequency $\omega_1^*$ is near zero in equation (7), equation (8) holds.

[Equation 8]

$$Pc_{[\omega_1^* \approx 0]} = R \cdot (Idc^2 + Iqc^2) \quad (8)$$

In case that segments are provided, in which the first d-axis current command value Id* is set with two levels, zero and positive (or negative), when the active powers in the segments are set to $PC_{[Idc=0]}$ and $PC_{[Idc \neq 0]}$, a calculation of the equation (9) holds.

[Equation 9]

$$PC_{[Idc \neq 0]} - PC_{[Idc=0]} = R \cdot Idc^2 \quad (9)$$

From equation (10), the identified value R^ of the resistance R can be calculated.

[Equation 10]

$$R^\wedge = \frac{Pc_{[Idc>0]} - Pc_{[Idc=0]}}{Idc^2} \quad (10)$$

Next, the principle of identifying the d-axis and q-axis inductances Ld and Lq and the induced voltage coefficient Ke will be described, focusing on the reactive power Q.

The reactive power Q of the permanent magnet synchronous motor 1 can be represented by using equation (11).

[Equation 11]

$$Q = Vd \cdot Iq + Vq \cdot Id \quad (11)$$

Equations (3) and (11) yield equation (12).

[Equation 12]

$$Q = (R \cdot Id - \omega_1 \cdot Lq \cdot Iq) \cdot Iq - \quad (12)$$
$$(R \cdot Iq + \omega_1 \cdot Ld \cdot Id + \omega_1 \cdot Ke) \cdot Id$$
$$= -\omega_1 \cdot (Lq \cdot Iq^2 + Ld \cdot Id^2 + Ke \cdot Id)$$

If the reactive power calculated by the controller is set to Qc, it is represented as follows.

[Equation 13]

$$Qc = Vdc^* \cdot Iqc - Vqc^* \cdot Idc \quad (13)$$

Assuming that the motor axis is aligned with the control axis, when, in equation (12), the motor currents Id and Iq are replaced with the detected motor currents Idc and Iqc and the motor frequency $\omega_1$ is replaced with the calculated motor frequency $\omega_1^*$, equation (14) holds.

[Equation 14]

$$Qc = -\omega_1^* \cdot (Lq \cdot Iqc^2 + Ld \cdot Idc^2 + Ke \cdot Idc) \quad (14)$$

Equation (14) indicates that the calculated reactive power Qc includes the d-axis and q-axis inductances Ld and Lq and the induced voltage coefficient Ke, which are motor constants.

First, the principle of identifying the q-axis inductance Lq will be described.

If the d-axis current command value Id* is set to zero in the d-axis current command setting unit 7 in FIG. 1 and the calculated reactive power Qc obtained from the power calculating unit 10 is set to $Qc_{[Idc=0]}$, equation (15) holds.

[Equation 15]

$$Qc_{[Idc=0]} = -\omega_1^* \cdot (Lq \cdot Iqc^2) \quad (15)$$

The identified value Lq^ of the q-axis inductance Lq can be calculated from equation (16).

[Equation 16]

$$Lq^\wedge = \frac{|Qc_{[Idc=0]}|}{\omega_1^* \cdot Iqc^2} \quad (16)$$

Second, the principle of identifying the induced voltage coefficient Ke will be described.

If segments are provided, in which the first d-axis current command value Id* is set with two levels, positive and negative, equation (17) holds for the calculated reactive powers $Qc_{[Idc>0]}$ and $Qc_{[Idc<0]}$ obtained in the segments.

[Equation 17]

$$Qc_{[Idc>0]} - Qc_{[Idc<0]} = -2 \cdot \omega_1^* \cdot Ke \cdot |Idc| \quad (17)$$

From equation (18), the identified value Ke^ of the induced voltage coefficient Ke can be calculated.

[Equation 18]

$$Ke\hat{} = \frac{|Qc_{[Idc>0]} - Qc_{[Idc<0]}|}{2 \cdot \omega_1^* \cdot |Id|} \quad (18)$$

Third, the principle of identifying the d-axis inductance Ld will be described. Equation (19) holds for the calculated reactive powers $Qc_{[Idc>0]}$ and $Qc_{[Idc<0]}$.

[Equation 19]

$$Qc_{[Idc>0]} + Qc_{[Idc<0]} = -2 \cdot \omega_1^* \cdot (Ld \cdot Idc^2 + Lq \cdot Iqc^2) \quad (19)$$

Equations (15) and (19) yield equation (20).

[Equation 20]

$$Qc_{[Idc>0]} + Qc_{[Idc<0]} + 2 \cdot Qc_{[Idc=0]} = -2 \cdot \omega_1^* \cdot Ld \cdot Idc^2 \quad (20)$$

The identified value Ld of the d-axis inductance Ld can be calculated from equation (21).

[Equation 21]

$$Ld\hat{} = \frac{|Qc_{[Idc>0]} + Qc_{[Idc<0]} + 2 \cdot Qc_{[Idc=0]}|}{2 \cdot \omega_1^* \cdot Idc^2} \quad (21)$$

This completes the description of the principles of identifying the motor constants.

Now, the configuration of the motor constant identifying unit 11, which is a feature of the present invention, will be described with reference to FIGS. 1, 4, and 5.

Described first is resistance R identification calculation performed in a low-speed area, which is a feature of the present invention.

Figure 4:
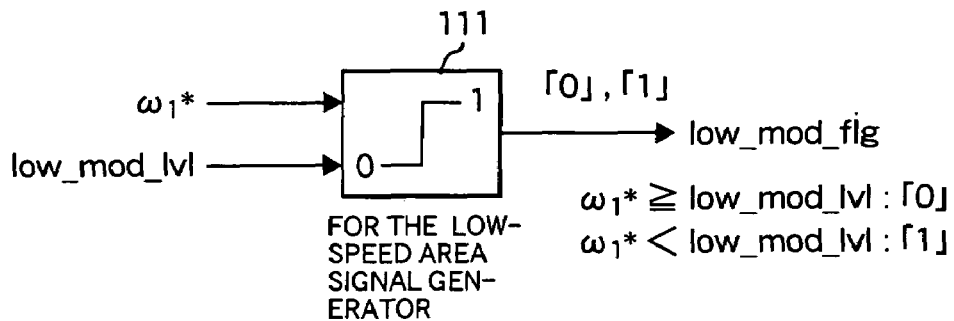
FIG. 4 illustrates a motor constant identifying unit 11 in the controller in FIG. 1.

FIG. 4 illustrates a motor constant identifying unit 11 in the controller in FIG. 1. In FIG. 4, the calculated frequency $\omega_1^*$ is input to the signal generator 111, which determines whether the area is the low-speed area. The signal generator 111 compares the calculated frequency $\omega_1^*$ with a low-speed area detection level (low_mod_lvl), and sets a decision flag (low_mod_flg) according to equation (22).

[Equation 22]

$$\left( \begin{array}{l} \omega_1^* \geq \text{low\_mod\_lvl: low\_mod\_flg} = 0 \\ \omega_1^* < \text{low\_mod\_lvl: low\_mod\_flg} = 1 \end{array} \right) \quad (22)$$

If the decision flag is set to 1, the area is determined as the low-speed area and calculation is performed to identify the resistance R.

The low-speed detection level is several percent or less of the rated rotational speed of the motor.

The d-axis current command setting unit 7 in FIG. 1 sets the d-axis current command value Id* to one of at least two levels, zero and positive (or negative).

Next, the resistance R identification calculation will be specifically described with reference to FIG. 5.

Figure 5:
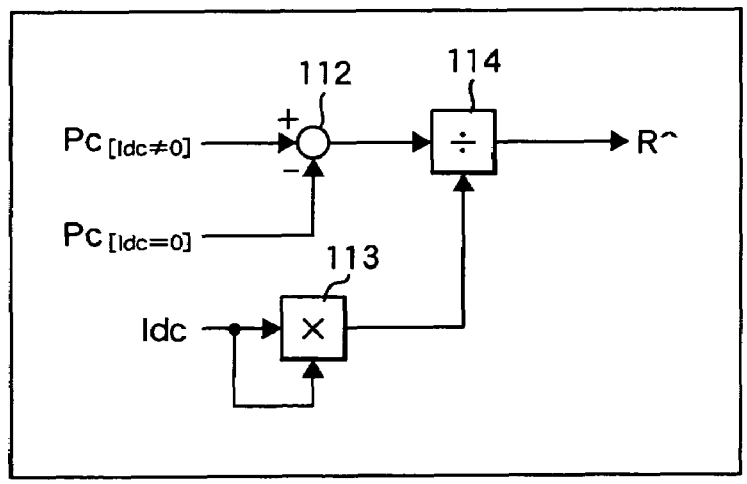
FIG. 5 also illustrates the motor constant identifying unit 11 in the controller in FIG. 1.

FIG. 5 also illustrates the motor constant identifying unit 11 in the controller in FIG. 1. A subtracting unit 112 receives the calculated active power $Pc_{[Idc=0]}$, which is an output signal supplied from the power calculating unit 10 when the d-axis current command value Id* is set to the positive level, and the calculated active power $Pc_{[Idc\neq 0]}$, which is also an output signal supplied from the power calculating unit 10 when the d-axis current command value Id* is set to the zero level. The output from the subtracting unit 112 is input to the dividing unit 114 together with a value obtained by squaring the detected d-axis current Idc, which is an output signal from a multiplying unit 113. The output signal from the dividing unit 114 is the identified value R^ of the resistance R.

Next, calculation for identifying the d-axis and q-axis inductances Ld and Lq and the induced voltage coefficient Ke, which is executed in the middle to high-speed area, will be described with reference to FIGS. 6 to 10.

Figure 6:
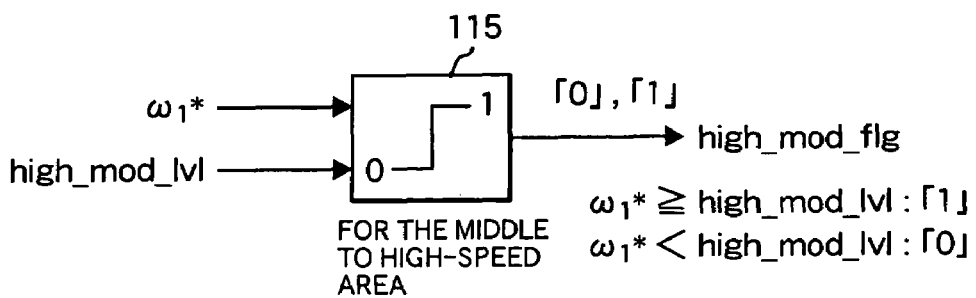
FIG. 6 also illustrates the motor constant identifying unit 11 in the controller in FIG. 1.

FIG. 6 also illustrates the motor constant identifying unit 11 in the controller in FIG. 1. The calculated frequency $\omega_1^*$ is input to a signal generator 115, which determines whether the area is the middle to high-speed area. The signal generator 115 compares the calculated frequency $\omega_1^*$ with the middle to a high-speed detection level (high_mod_lvl), and sets a decision flag (high_mod_flg) according to equation (23).

[Equation 23]

$$\left( \begin{array}{l} \omega_1^* \geq \text{high\_mod\_lvl: low\_mod\_flg} = 1 \\ \omega_1^* < \text{high\_mod\_lvl: low\_mod\_flg} = 0 \end{array} \right) \quad (23)$$

If the decision flag is set to 1, the area is determined as the middle to high-speed area and calculation is performed to identify the inductance and induced voltage coefficient. The middle to high-speed area detection level is about 10 percent or more of the rated rotational speed of the motor.

Figure 7:
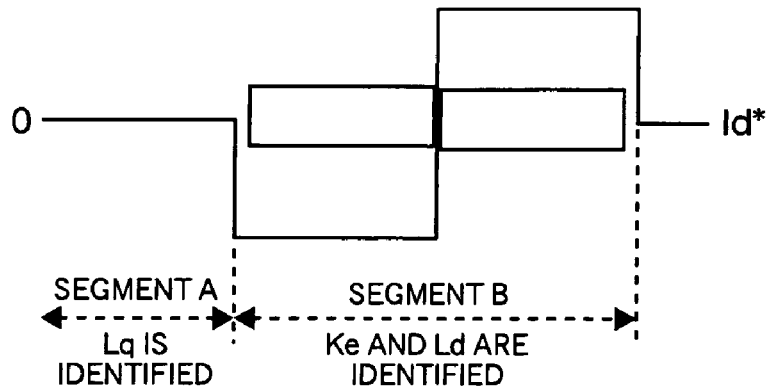
FIG. 7 also illustrates the motor constant identifying unit 11 in the controller in FIG. 1.

FIG. 7 shows a relation between the setting pattern of the first d-axis current command value Id* and the identification segments of three motor constants (Ld, Lq, and Ke).

When Idc is within the 0-level segment (segment A), the q-axis inductance Lq is identified. When Idc is then within the positive and negative segments (segment B), the d-axis inductance Ld and induced voltage coefficient Ke are identified.

Figure 8:
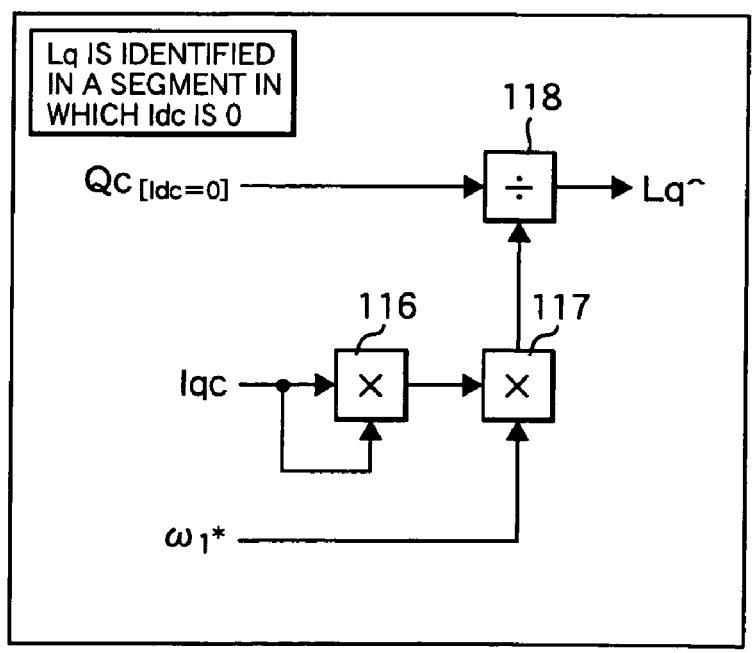
FIG. 8 also illustrates the motor constant identifying unit 11 in the controller in FIG. 1.
Figure 9:
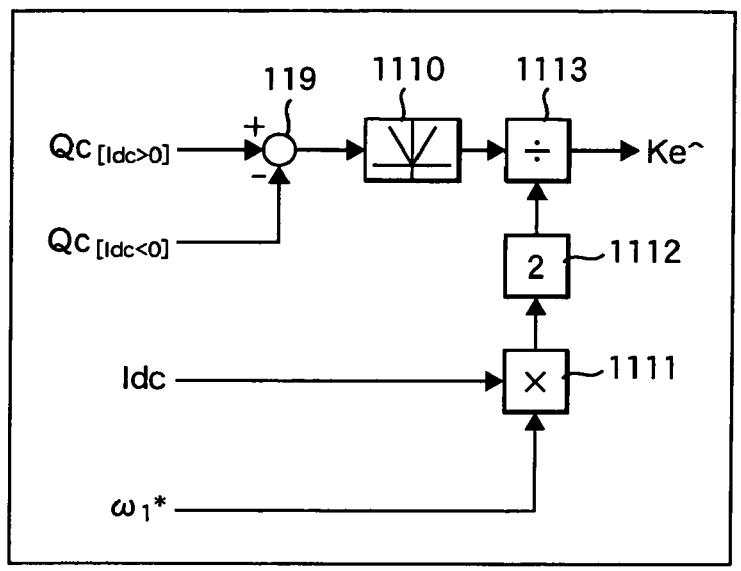
FIG. 9 also illustrates the motor constant identifying unit 11 in the controller in FIG. 1.
Figure 10:
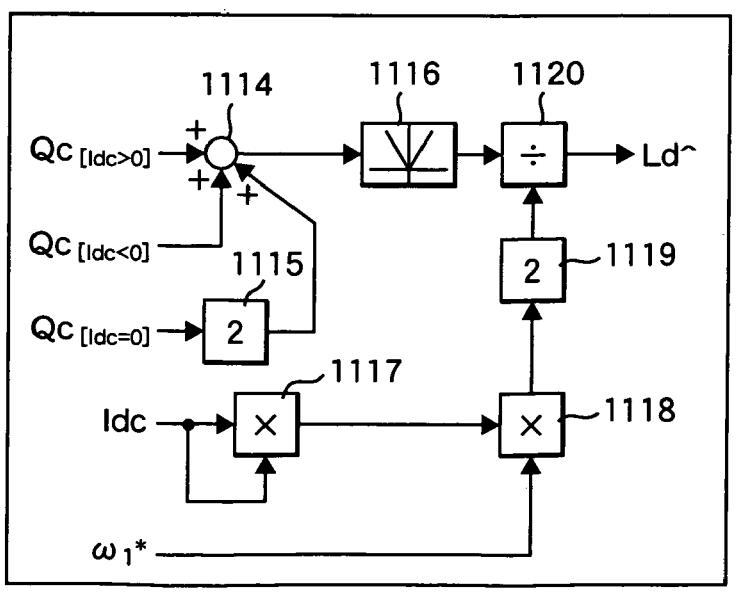
FIG. 10 also illustrates the motor constant identifying unit 11 in the controller in FIG. 1.

This process will be described with reference to FIGS. 8 to 10.

First, calculation for identifying the q-axis inductance Lq will be described with reference to FIG. 8.

A multiplying unit 116 receives the detected d-axis current Idc and outputs a square of Idc. A multiplying unit 117 receives the calculated frequency $\omega_1^*$ and the output signal from the multiplying unit 116.

A dividing unit 118 receives the output signal from the multiplying unit 117 and $Qc_{[Idc=0]}$, which is an output signal supplied from the power calculating unit 10 when the d-axis current command value Id* is set to the zero level.

An output signal from the dividing unit 118 is the identified value Lq^ of the q-axis inductance Lq.

Second, calculation for identifying the induced voltage coefficient Ke will be described with reference to FIG. 9.

A subtracting unit 119 receives the calculated reactive power $Qc_{[Idc>0]}$, which is an output signal supplied from the power calculating unit 10 when the d-axis current command value Id* is set to the positive level, and the calculated reactive power $Qc_{[Idc<0]}$, which is also an output signal supplied from the power calculating unit 10 when the d-axis current command value Id* is set to the negative level. The output from the subtracting unit 119 is input to an absolute value calculating unit 1110.

A multiplying unit 1111 receives the detected d-axis current Idc and calculated frequency $\omega_1^*$. An output signal from the multiplying unit 1111 is multiplied by a constant 1112, which is 2, and the resulting signal is input to a dividing unit 1113 together with an output signal from the absolute value calculating unit 1110.

An output signal from the dividing unit 1113 is the identified value Ke^ of the induced voltage coefficient Ke.

Third, calculation for identifying the d-axis inductance Ld will be described with reference to FIG. 10. A subtracting unit 1114 receives the calculated reactive power $Qc_{[Idc>0]}$, which is an output signal supplied from the power calculating unit 10 when the d-axis current command value Id* is set to the positive level, $Qc_{[Idc<0]}$, which is also an output signal supplied from the power calculating unit 10 when the d-axis current command value Id* is set to the negative level, and a value obtained by multiplying Qc[Idc=0], which is an output signal supplied from the power calculating unit 10 when the d-axis current command value Id* is set to the zero level, by a constant 1115, which is 2. An output signal from the subtracting unit 1114 is input to an absolute value calculating unit 1116.

A multiplying unit 1117 receives the detected d-axis current Idc, and outputs a square of Idc. A multiplying unit 1118 receives the calculated frequency $\omega_1$* and the output signal from the multiplying unit 1117. An output signal from the multiplying unit 1118 is multiplied by a constant 1119, which is 2, and the resulting signal is input to a dividing unit 1120 together with an output signal from the absolute value calculating unit 1116.

An output signal from the dividing unit 1120 is the identified value Ld^ of the d-axis inductance Ld.

The vector control calculating unit 12 uses the identified values of the permanent magnet synchronous motor 1, which are obtained through calculation, to calculate the voltage command values Vdc* and Vqc* indicated in equation (24) so as to control the voltage command values Vu*, Vv*, and Vw* of the power converter. Accordingly, a vector controller for a permanent magnet synchronous motor, which achieves highly precise, highly responsive torque control immediately before or during an actual operation, can be provided.

[Equation 24] (24)

$$\begin{bmatrix} Vdc^* \\ Vqc^* \end{bmatrix} = \begin{bmatrix} R^\wedge & -\omega_1^* \cdot Lq^\wedge \\ \omega_1^* \cdot Ld^\wedge & R^\wedge \end{bmatrix} \cdot \begin{bmatrix} Id^{} \\ Iq^{} \end{bmatrix} + \begin{bmatrix} 0 \\ \omega_1^* \cdot Ke^\wedge \end{bmatrix}$$

Second Embodiment

In the method described in the first embodiment, the output values (R^, Ld^, Lq^, and Ke^) from the motor constant identifying unit 11 are used to set the motor constants of the vector control calculating unit 12. The output of the motor constant identifying unit 11 can also be used to modify control gains of second d-axis and q-axis current command calculating units 8a and 9a.

Figure 11:
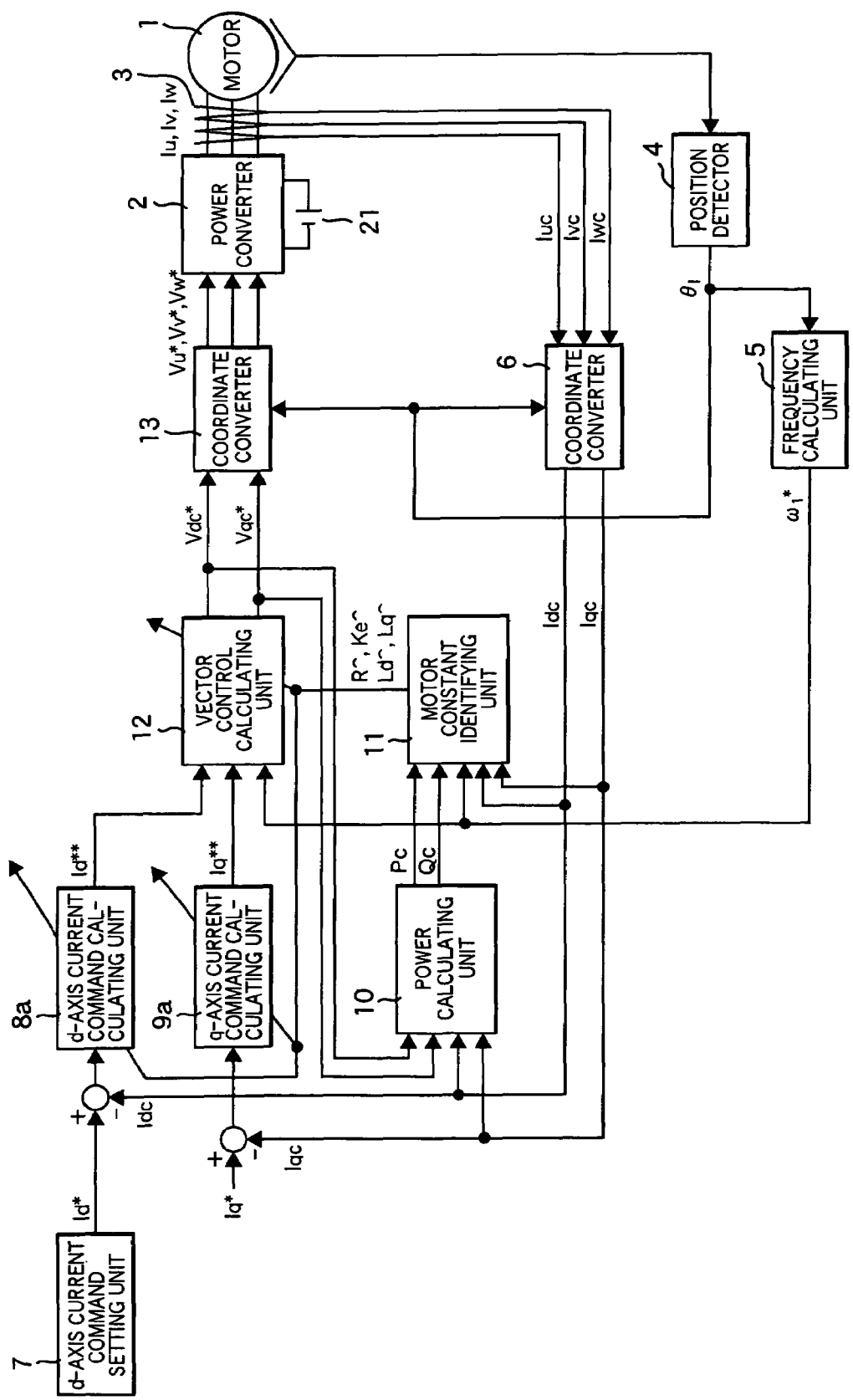
FIG. 11 shows the structure of a vector controller for a permanent magnet synchronous motor that implements another embodiment of the present invention.

FIG. 11 shows the structure of a vector controller for a permanent magnet synchronous motor that implements a second embodiment of the present invention, which is implemented for the above-mentioned control gain modification. The reference numerals 1 to 7, 10 to 13, and 21 in FIG. 11 indicate the same elements having the same reference numerals in FIG. 1.

As indicated by equation (25), if identified motor constants (R^, Ld^, Lq^, and Ke^) are used to modify the control gains (Kp_d, Ki_d, Kp_q, and Ki_q) of the current command calculating units 8a and 9a, a highly precise, highly responsive torque control system can be achieved.

[Equation 25] (25)

$$\begin{cases} Kp\_d = \omega_c\_acr \cdot \frac{Ld^\wedge}{R^\wedge}, & Ki\_d = \omega_c\_acr \\ Kp\_q = \omega_c\_acr \cdot \frac{Lq^\wedge}{R^\wedge}, & Ki\_q = \omega_c\_acr \end{cases}$$

In the above equation, Kp_d is a proportional gain used to calculate the second d-axis current command value, Ki_d is an integration gain, Kp_q is a proportional gain used to calculate the second q-axis current command value, Ki_q is an integration gain, and ωc_acr is a current control response angular frequency (rad/s).

Third Embodiment

Figure 12:
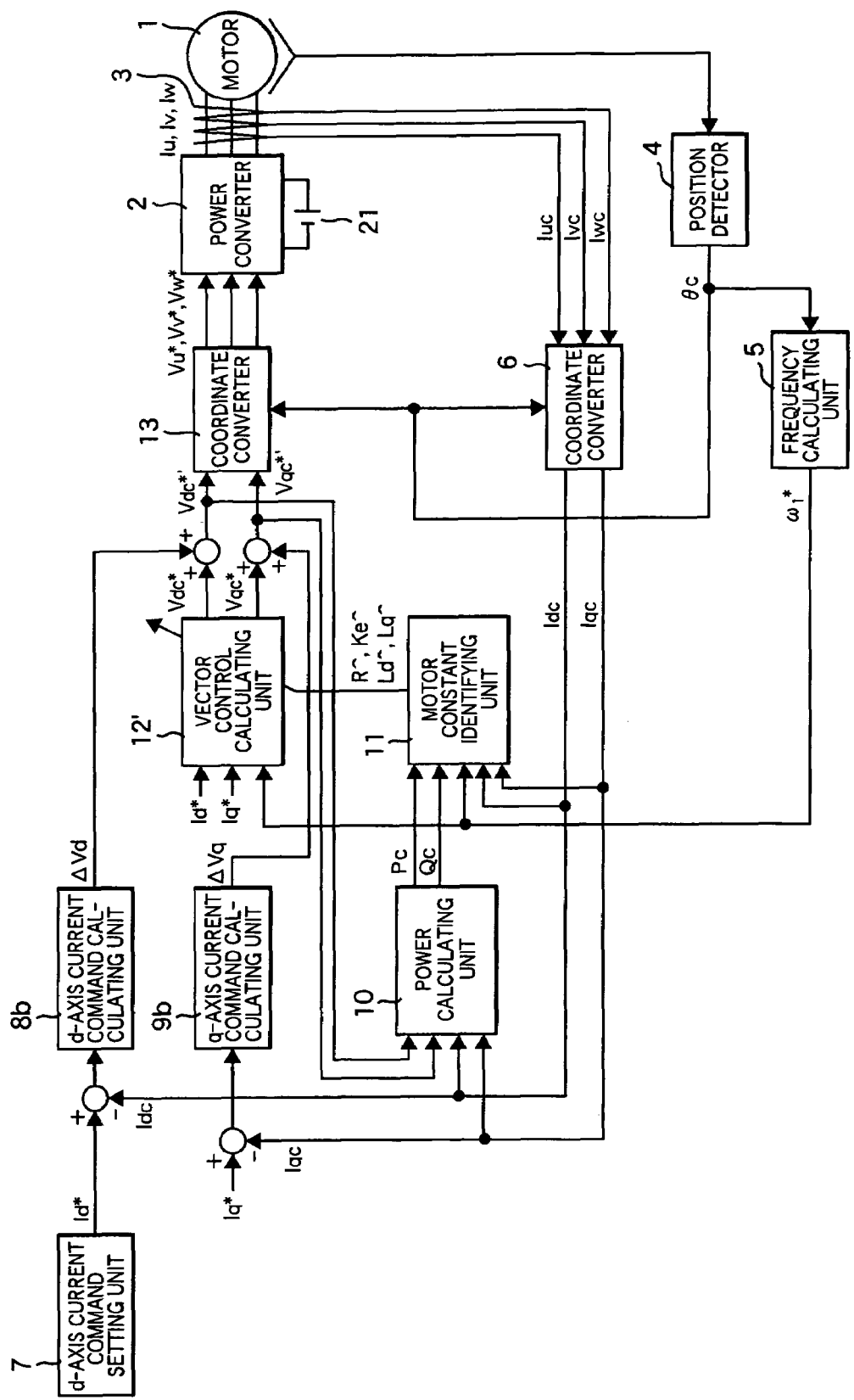
FIG. 12 shows the structure of a vector controller for a permanent magnet synchronous motor that implements yet another embodiment of the present invention.

FIG. 12 shows the structure of a vector controller for a permanent magnet synchronous motor that implements yet another embodiment of the present invention. This embodiment uses a difference between a current command value given from a high-end unit and a detected current to compensate output values Vdc* and Vqc* in vector control calculation.

The reference numerals 1 to 7, 10, 11, 13 and 21 in FIG. 12 indicate the same elements having the same reference numerals in FIG. 1. A d-axis current control calculating unit 8b calculates a d-axis compensation voltage ΔVd so that the detected d-axis current Idc matches the d-axis current command value Id*. A q-axis current control calculating unit 9b calculates a q-axis compensation voltage ΔVq so that the detected q-axis current Iqc matches the q-axis current command value Iq*. A vector control calculating unit 12' uses the d-axis and q-axis current command values Id* and Iq*, the calculated frequency $\omega_1$*, and the values (R^, Ld^, Lq^, and Ke^) output by the motor constant identifying unit 11 to output the voltage command values Vdc* and Vqc*.

This embodiment differs from the embodiment shown in FIG. 1 in that the d-axis and q-axis current control calculating units 8b and 9b respectively calculate the compensation values ΔVd and ΔVq so that the detected currents Idc and Iqc match the current command value Id* and Iq* given from a high-end unit.

The vector control calculating unit 12' uses the current command values Id* and Iq*, the frequency command value $\omega_1$*, and the identified motor constant settings to calculate the voltage command reference values Vdc* and Vqc* shown in equation (26).

[Equation 26] (26)

$$\begin{bmatrix} Vdc^* \\ Vqc^* \end{bmatrix} = \begin{bmatrix} R^\wedge & -\omega_1^* \cdot Lq^\wedge \\ \omega_1^* \cdot Ld^\wedge & R^\wedge \end{bmatrix} \cdot \begin{bmatrix} Id^* \\ Iq^* \end{bmatrix} + \begin{bmatrix} 0 \\ \omega_1^* \cdot Ke^\wedge \end{bmatrix}$$

Another difference is that the voltage command values Vdc*' and Vqc*' of the motor converter are calculated as indicated by equation (27).

[Equation 27]

$$\begin{bmatrix} Vdc^{*\prime} \\ Vqc^{*\prime} \end{bmatrix} = \begin{bmatrix} Vdc^* \\ Vqc^* \end{bmatrix} + \begin{bmatrix} \Delta Vd \\ \Delta Vq \end{bmatrix} \quad (27)$$

It would be understood that, in vector control calculation of this type as well, an operation is performed similarly as in the embodiments described above, and a similar effect is provided.

Fourth Embodiment

In the method described in the third embodiment, the output values ($R^{\wedge}$, $Ld^{\wedge}$, $Lq^{\wedge}$, and $Ke^{\wedge}$) of the motor constant identifying unit 11 are used to set the motor constants used by the vector control calculating unit 12'. The output of the motor constant identifying unit 11 can also be used to modify control gains of the second d-axis and q-axis current command calculating units 8c and 9c.

Figure 13:
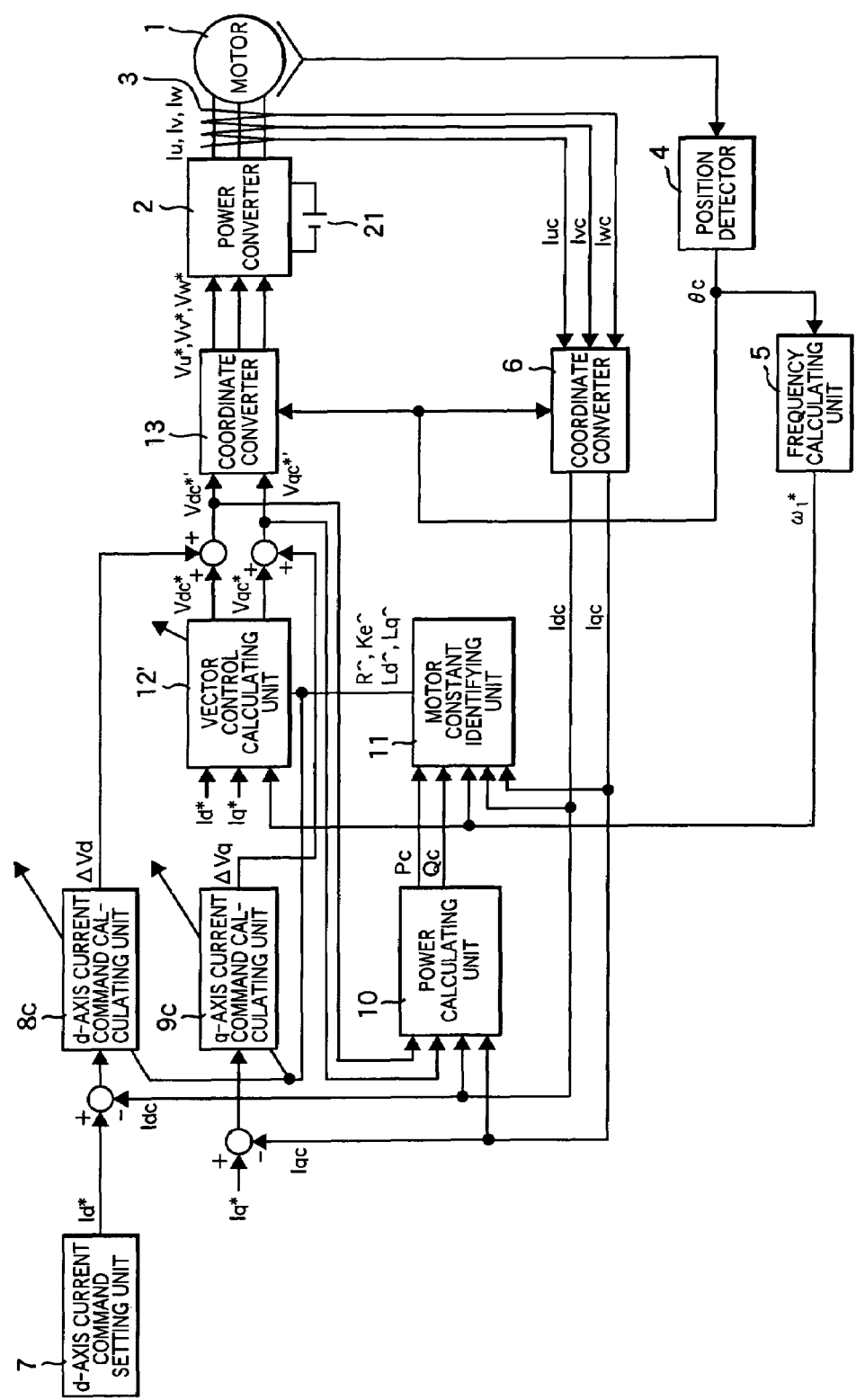
FIG. 13 shows the structure of a vector controller for a permanent magnet synchronous motor that implements still another embodiment of the present invention.

FIG. 13 shows the structure of a vector controller for a permanent magnet synchronous motor that implements a fourth embodiment of the present invention, which is implemented for the above-mentioned control gain modification. The reference numerals 1 to 7, 10, 11, 12', 13, and 21 in FIG. 13 indicate the same elements having the same reference numerals in FIG. 12.

As indicated by equation (28), if the identified motor constants ($R^{\wedge}$, $Ld^{\wedge}$, and $Lq^{\wedge}$) are used to modify the control gains (Kp_d1, Ki_d1, Kp_q1, and Ki_q1) of the current command calculating units 8c and 9c, a highly precise, highly responsive torque control system can be achieved.

[Equation 28]

$$\begin{pmatrix} Kp\_d1 = \omega_c\_\text{acr} \cdot Ld^{\wedge}, & Ki\_d1 = \omega_c\_\text{acr} \cdot R^{\wedge} \\ Kp\_q1 = \omega_c\_\text{acr} \cdot Lq^{\wedge}, & Ki\_q1 = \omega_c\_\text{acr} \cdot R^{\wedge} \end{pmatrix} \quad (28)$$

In the above equation, Kp_d1 is a proportional gain used for d-axis current control calculation, Ki_d1 is an integration gain, Kp_q1 is a proportional gain used for q-axis current control calculation, Ki_q1 is an integration gain, and $\omega c\_acr$ is a current control response angular frequency (rad/s).

Fifth Embodiment

In the method in the first embodiment, an expensive current detector 3 is used to detect three-phase AC currents Iu, Iv, and Iw. However, a fifth embodiment can also be applied to a controller that uses an inexpensive current detector.

Figure 14:
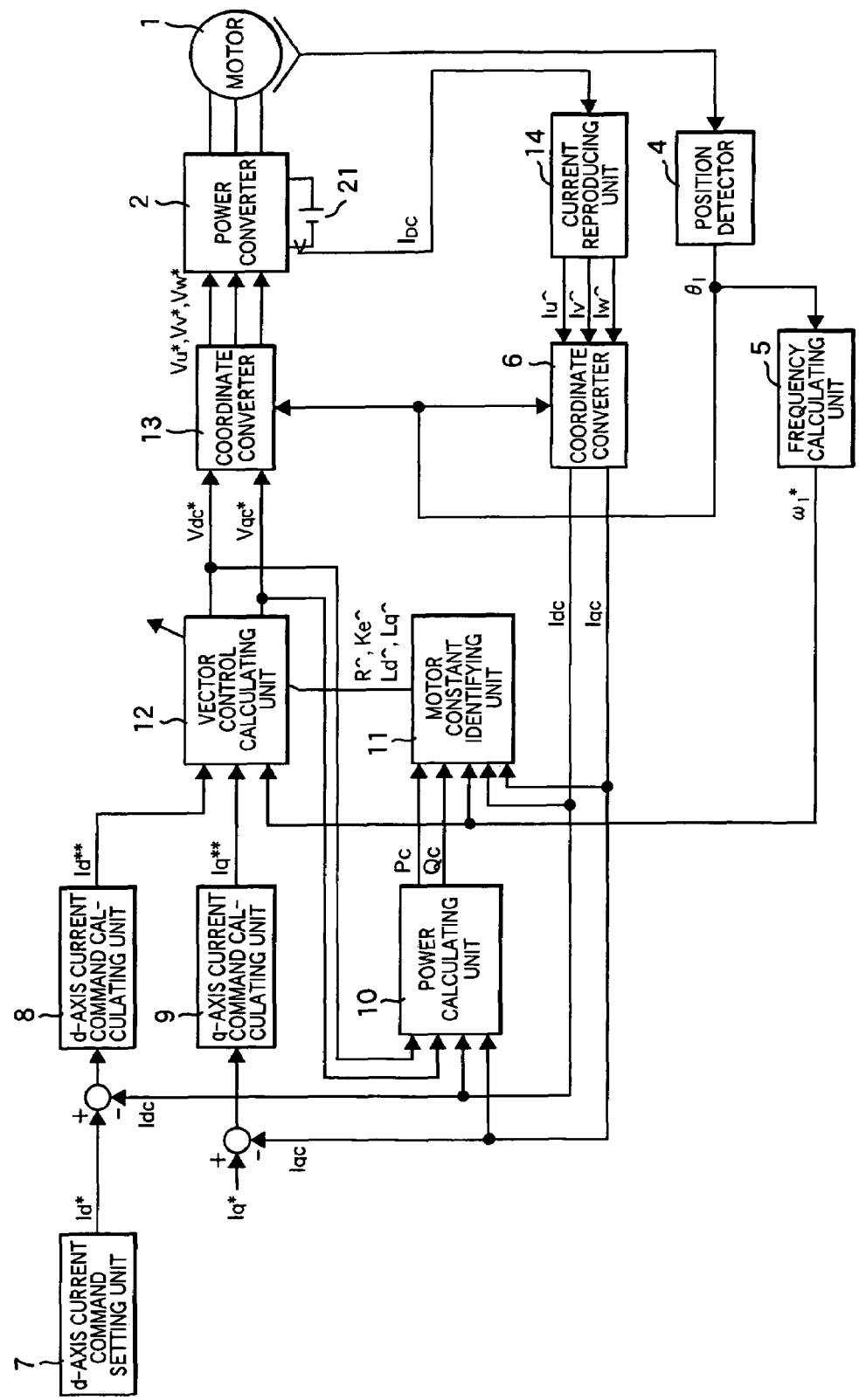
FIG. 14 shows the structure of a vector controller for a permanent magnet synchronous motor that implements still another embodiment of the present invention.

FIG. 14 shows the structure of a vector controller for a permanent magnet synchronous motor that implements the fifth embodiment of the present invention. The reference numerals 1, 2, 4 to 13, and 21 in FIG. 14 indicate the same elements having the same reference numerals in FIG. 1. A current reproducing unit 14 estimates the three-phase currents Iu, Iv, and Iw, which flow in the permanent magnet synchronous motor 1, from a DC current $I_{DC}$, which flows in the input bus of the power converter.

The coordinate converter 6 calculates the detected d-axis and q-axis currents Idc and Iqc from the estimated currents $Iu^{\wedge}$, $Iv^{\wedge}$, and $Iw^{\wedge}$. A system that does not have a current sensor as described above is inexpensive, but it would be understood that an operation is performed similarly as in the first embodiment and a similar effect is provided.

It would be also understood that even when the method is applied to the second, third, and fourth embodiments, an operation is performed similarly as in the first embodiment and a similar effect is provided, regardless of inexpensiveness.

Sixth Embodiment

A sixth embodiment, in which the present invention is applied to a module, will be described with reference to FIG. 15.

Figure 15:
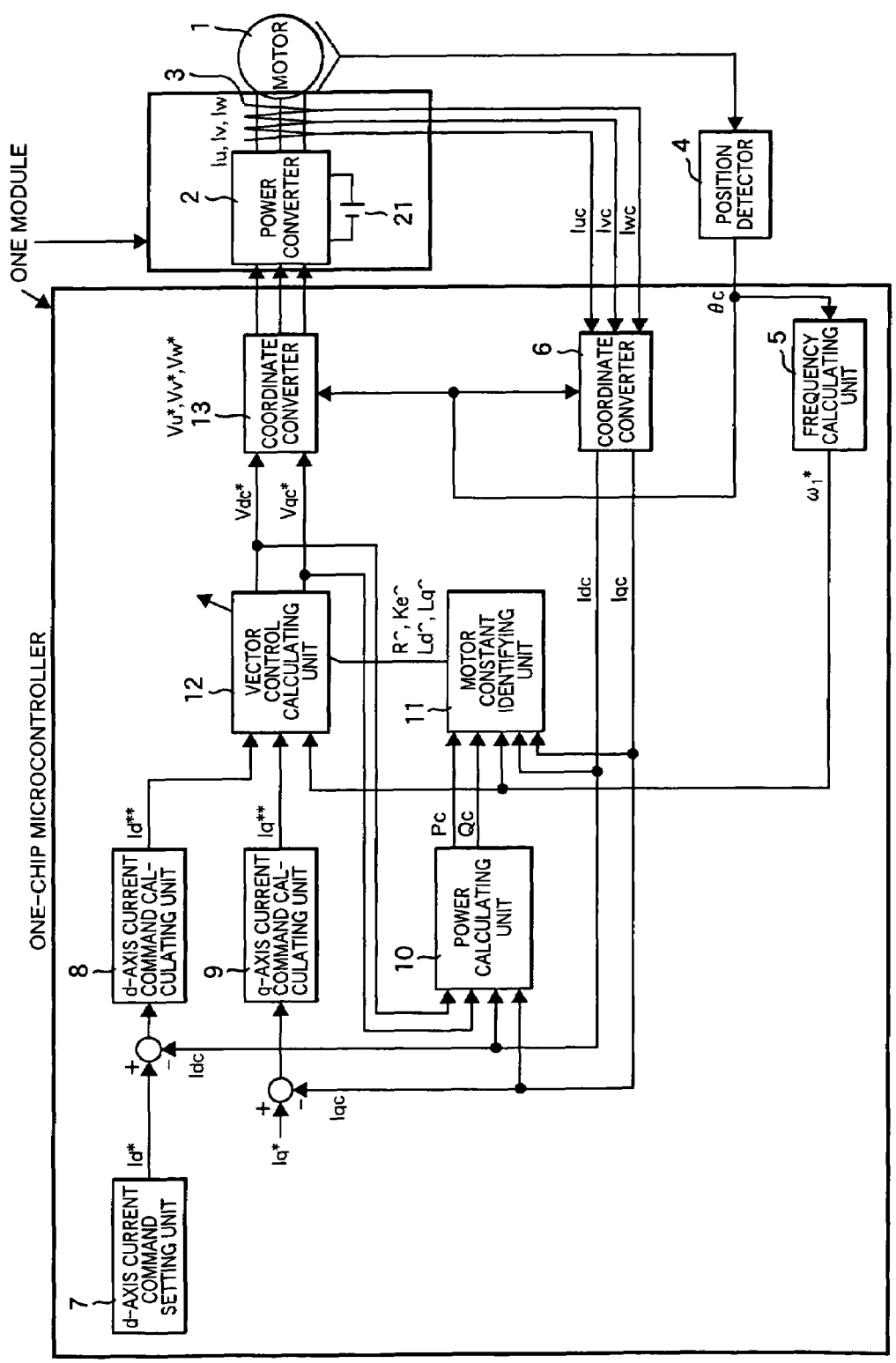
FIG. 15 shows an exemplary structure in an embodiment of the present invention.

FIG. 15 shows an exemplary structure in an embodiment of the present invention. The frequency calculating unit 5, the coordinate converter 6, the d-axis current command setting unit 7, the d-axis current command calculating unit 8, the q-axis current command calculating unit 9, the power calculating unit 10, the motor constant identifying unit 11, the vector control calculating unit 12, and the coordinate converter 13 constitute a one-chip microcontroller.

The one-chip microcontroller and the power converter are configured as a single module on a single board. The term module referred to herein means a standardized configuration unit and comprises separable hardware and software components. The one-chip microcontroller and the power converter are preferably disposed on a single board for convenience in manufacturing, but are not limited to a single board. They may be disposed on a plurality of circuit boards included in a single case. In other embodiments, a similar configuration can be used.

Seventh Embodiment

In the embodiments described above, the motor constants are calculated and identified by the motor constant identifying unit 11, and the identified motor constants are used by the vector control calculating unit. However, it would be conceivable that the motor constant identifying unit 11 calculates and displays the motor constants.

Accordingly, changes in the permanent magnet motor properties can be made visible. This also makes it possible for a degree of deterioration of the permanent magnet motor to be recognized. Also provided is an effect that when the degree of deterioration proceeds to some extent, a time to change the motor is noticed.

What is claimed is:

1. A vector controller for a permanent magnet synchronous motor that uses current command values and detected currents of a d-axis and a q-axis, a calculated frequency, and a setting of a motor constant to control an output voltage of a power converter, wherein the motor constant is identified by use of active power or reactive power obtained from an output voltage of the power converter and a detected current thereof, as well as a calculated frequency and the detected current.

2. The vector controller for a permanent magnet synchronous motor according to claim 1, wherein segments are provided in a low-speed area, in which the d-axis current command value is controlled with at least two levels, positive or negative and zero; the absolute value of the active power with the d-axis current command value in the zero segment is subtracted from the absolute value of the active power with the d-axis current command value in the positive or negative segment; the resistance of the motor is identified by dividing a value resulting from the subtraction by a square of the positive or negative detected d-axis current.

3. The vector controller for a permanent magnet synchronous motor according to claim 1, wherein the d-axis current command value is set to zero in a middle to high-speed area; the q-axis inductance of the motor is identified by dividing the absolute value of the reactive power by a value obtained by multiplying the calculated frequency by a square of the detected q-axis current.

4. The vector controller for a permanent magnet synchronous motor according to claim 1, wherein segments are provided in a middle to high-speed area, in which the d-axis current command value is controlled with at least two levels, positive and negative; the absolute value of the reactive power with the d-axis current command value in the negative segment is subtracted from the absolute value of the reactive power with the d-axis current command value in the positive segment; the induced voltage coefficient of the motor is identified by dividing a value resulting from the subtraction by a value obtained by multiplying the calculated frequency by the detected d-axis current.

5. The vector controller for a permanent magnet synchronous motor according to claim 1, wherein segments are provided in a middle to high-speed area, in which the d-axis current command value is controlled with at least three levels, positive, negative, and zero; a value equivalent to twice the absolute value of the reactive power with the d-axis current command value in the negative segment, a value equivalent to twice the absolute value of the reactive power with the d-axis current command value in the negative segment, and a value equivalent to twice the absolute value of the reactive power with the d-axis current command value in the zero segment are added; the d-axis inductance of the motor is identified by dividing a value resulting from the addition by a value equivalent to twice a value obtained by multiplying a square of a calculated frequency by a square of a detected d-axis current.

6. The vector controller for a permanent magnet synchronous motor according to claim 1, wherein the output voltage of the power converter is calculated from a second current command value calculated from the d-axis and q-axis current command values, the motor constant, and the calculated frequency.

7. The vector controller for a permanent magnet synchronous motor according to claim 1, wherein the output voltage of the power converter is a value resulting from an addition of an output value from a vector control calculating unit and an output value from a current control calculating unit, the output value from the vector control calculating unit being calculated from first d-axis and q-axis current command values, the calculated frequency, and the motor constant, the output value from the current control calculating unit being controlled so that the detected current of the motor follows the first current command value.

8. The vector controller for a permanent magnet synchronous motor according to claim 1, wherein the motor constant obtained from the identification calculation is used to modify a motor constant setting used in calculation of the output voltage from the power converter.

9. The vector controller for a permanent magnet synchronous motor according to claim 6, wherein the motor constant obtained from the identification calculation is used to modify a control gain used in calculation of the second current command value.

10. The vector controller for a permanent magnet synchronous motor according to claim 7, wherein the motor constant obtained from the identification calculation is used to modify a control gain used in calculation of the output value from the current control calculating unit.

11. The vector controller for a permanent magnet synchronous motor according to claim 1, wherein the detected current is a motor current reproduced from a detected DC current flowing in an input bus of the power converter.

12. An inverter module having a vector controller for a permanent magnet synchronous motor and a power converter, the vector controller controlling an output voltage from the power converter according to current command values and detected currents of a d-axis and a q-axis, a calculated frequency, and a setting of a motor constant, wherein active power or reactive power obtained from the output voltage supplied from the power converter and the detected current as well as the calculated frequency and the detected current are used to identify the motor constant.

13. A permanent magnet synchronous motor constant display system having a controller for a permanent magnet synchronous motor and a display apparatus, the controller controlling an output voltage from the power converter according to current command values and detected currents of a d-axis and a q-axis, a calculated frequency, and a setting of a motor constant, the system including a motor constant calculating unit that uses active power or reactive power obtained from the output voltage supplied from the power converter and the detected current as well as the calculated frequency and the detected current to obtain the motor constant, wherein the motor constant is displayed on the display apparatus.

* * * * *